Figure 1:
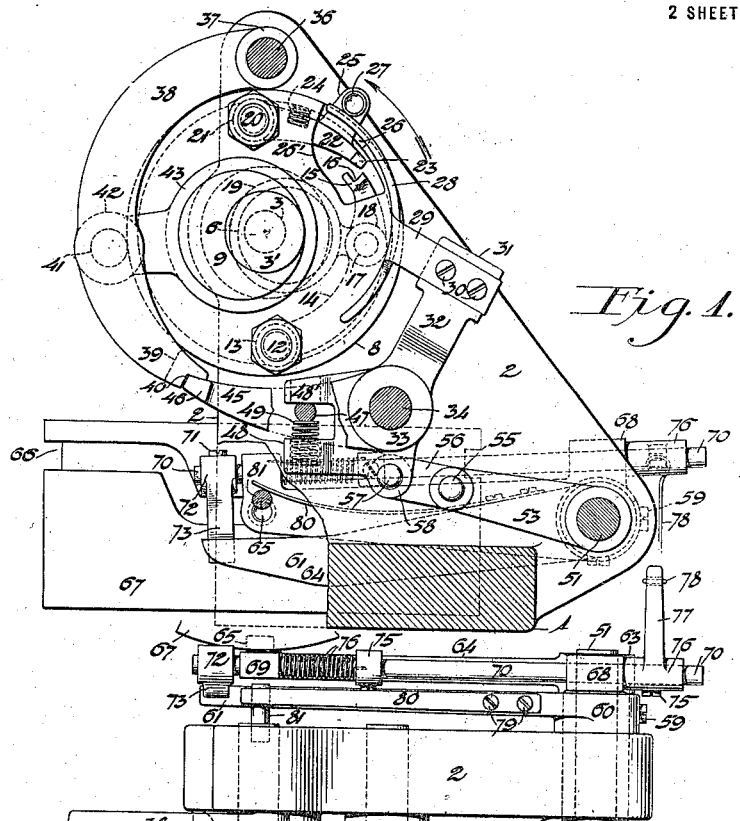

A. H. DE VOE.
DRIVING DEVICE.
APPLICATION FILED MAR. 17, 1915.

1,260,760.

Patented Mar. 26, 1918.
2 SHEETS—SHEET 1.

WITNESSES:

INVENTOR
Albert H. DeVoe
BY
Henry J. Miller
ATTORNEY

A. H. DE VOE.
DRIVING DEVICE.
APPLICATION FILED MAR. 17, 1915.

1,260,760.

Patented Mar. 26, 1918.
2 SHEETS—SHEET 2.

WITNESSES:
Gera L. Terno
L. E. Fischer

INVENTOR
Albert H. DeVoe
BY
Henry J. Miller
ATTORNEY

UNITED STATES PATENT OFFICE.

ALBERT H. DE VOE, OF WESTFIELD, NEW JERSEY, ASSIGNOR TO THE SINGER MANUFACTURING COMPANY, A CORPORATION OF NEW JERSEY.

DRIVING DEVICE.

1,260,760. Specification of Letters Patent. Patented Mar. 26, 1918.

Application filed March 17, 1915. Serial No. 15,046.

*To all whom it may concern:*

Be it known that I, ALBERT H. DE VOE, a citizen of the United States, residing at Westfield, in the county of Union and State of New Jersey, have invented certain new and useful Improvements in Driving Devices, of which the following is a specification, reference being had therein to the accompanying drawings.

This invention relates to driving means for light machinery, such as sewing machines, wherein the mechanism is required to be operated at high speeds and to be arrested suddenly and with the operative parts in particular positions suitable for the shifting or replacement of the work.

The invention has for its object to effect without shock the coupling of the machine with a continuously and rapidly running driving member or actuator, and also to bring the machine to rest when disconnected from said driving member without an impact liable to break or disarrange the parts.

According to the present improvement, in its preferred embodiment, a continuously running driving pulley and a drum or pulley to be driven are mounted independently upon the same shaft, and the drum has fulcrumed thereon a vibratory coupling lever having an operative connection with a strap or collar embracing an eccentric or other crank element upon the hub of the driving pulley from which it normally derives vibratory movements relatively to such driving and driven members. Upon the drum is fulcrumed also a thrust-lever which is normally maintained out of the range of vibratory movement of said coupling lever, but is adapted to be shifted into engagement therewith and to interrupt its vibratory movements and thereby lock against movement its connection with the driving member, whereby the driving and driven members are caused to assume driving relation for rotation in unison. The thrust-lever is so mounted relatively to the coupling lever that the engagement of their adjacent extremities can take place only in an extreme position of the coupling lever and at its "dead point," thereby preventing delivery of a blow between the interengaging parts in the coupling together of the driving and driven members.

In conjunction with the coupling means, the improvement includes preferably means for insuring the arrest of the driven member in a predetermined position. To this end, a vibratory lever may be mounted upon a fixed fulcrum and provided with an operative connection with a strap or collar embracing a crank-element or eccentric upon the hub of the driven pulley from which it normally derives vibratory movements relatively to such driving and driven members. Upon a second fixed fulcrum is also mounted a stop-lever which is normally maintained out of the range of movement of said vibratory lever, but is adapted to be shifted into engagement therewith and to interrupt its vibratory movements and thereby lock against movement its connection with the driven member, whereby the driven member is forcibly detained against continued movement under its own momentum and that of mechanism which may be connected therewith.

The thrust lever preferably carries a roller-stud extending beyond the periphery of its supporting drum for engagement with a segmental cam-plate carried by an arm journaled upon the fulcrum of said stop-lever and pivotally connected eccentrically to the latter with one end of a short link having its other end connected with an operating lever with which it is adapted to assume extreme positions in substantial alinement with and in angular relation to said operating lever. The said link and operating lever thus constitute a controlling toggle device for shifting the cam-plate into and out of the normal path of movement of said roller-stud.

The stop-lever has a resilient connection with the cam-plate carrying arm. The actuation of the operating lever thus causes not only the positioning of the cam-plate for disengagement of the thrust-lever from the coupling lever but the simultaneous movement of the stop-lever into operative relation with its respective vibratory lever whose extremity it positively engages when the latter is in its retracted position and during the reversal of its movement. In the reverse movement of the operating lever, the stop-lever is retracted from stopping position for release of the driven member and the cam-plate is simultaneously shifted out of the path of movement of the roller-stud whereby the thrust-lever is permitted to move under the action of a spring into contact relation with the coupling lever which it operatively engages during the reversal of movement of the coupling lever in extreme retracted position, thereby coupling together the driving and driven members without impact of the interengaging parts.

In practice, the operating lever may be shifted manually for starting and stopping the rotation of the driven member, or it may be periodically operated by automatically acting means under conditions which exist in buttonhole stitching machines and other sewing machines designed for producing separate groups or successions of stitches of predetermined number.

The present invention is represented in the accompanying drawings embodied in driving mechanism suitable for use in connection with a buttonhole sewing machine, and comprising an actuating pulley or driving member with rotary drums or driven members mounted for movement independently of and at opposite sides of said pulley and provided with independent coupling means for connecting it in driving relation with said pulley and having independent stopping means for arresting their rotation when disconnected from the driving pulley.

Figure 2:
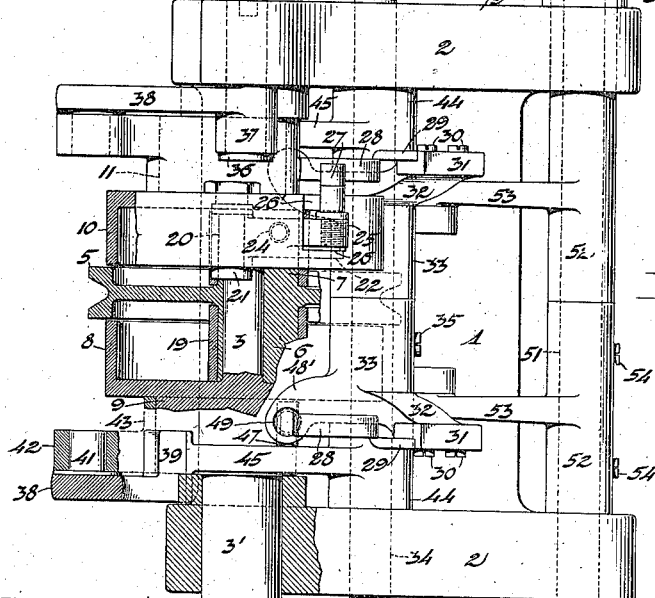
Figure 7:
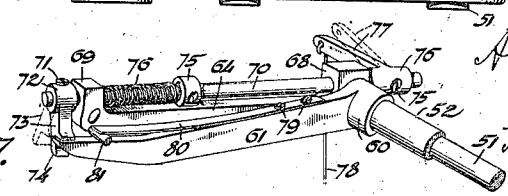
Figure 3:
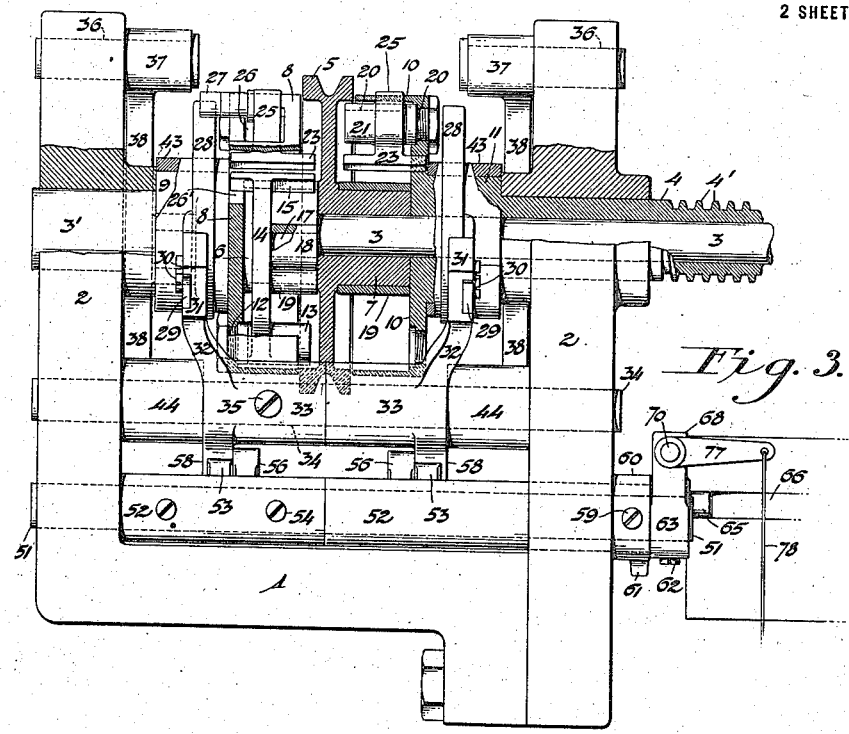
Figures 4, 5:
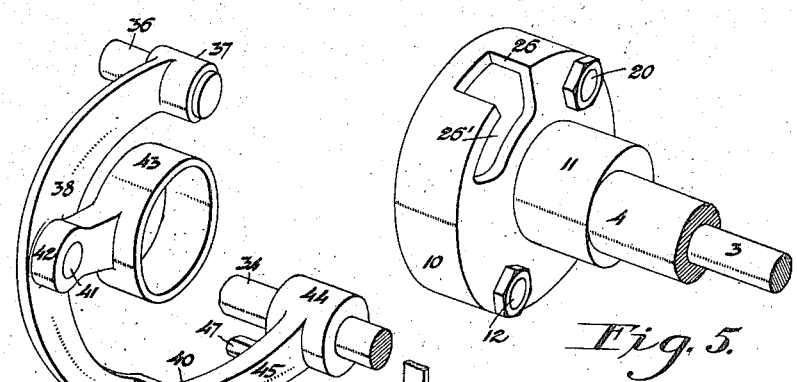
Figure 6:
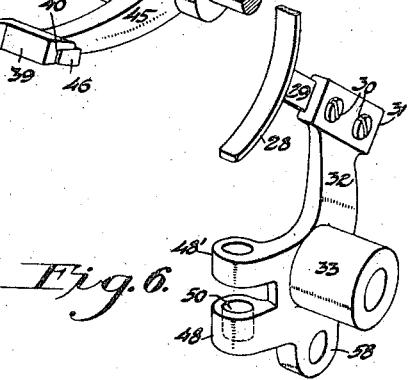

Figure 1 is an end elevation of a mechanism embodying the present invention, and Figs. 2 and 3 are respectively a plan and side elevation of the same, both views being partly in section. Fig. 4 is a perspective view of interengaging parts of the stopping mechanism. Fig. 5 is a perspective view of one of the driven members controlled in its operation by means according to the present improvement. Fig. 6 is a perspective view of the cam-plate and its carrying arm. Fig. 7 is a perspective view of a part of the controlling means.

As shown in the drawings, the mechanism of the present improvement is sustained by a supporting frame comprising the base 1 and bearing plates 2 suitably apertured to receive the shaft 3 with its surrounding sleeve 4. The grooved pulley or driving member 5 is constructed with a hub comprising oppositely extending eccentric bosses 6 and 7 mounted loosely upon the shaft 3 which is formed beyond the boss 6 with an enlarged portion 3' integral with which is the cylindrical drum 8 constituting one of the driven members and formed with an eccentric boss or crank-member 9 extending from its circular web oppositely from the pulley 5. Mounted upon the shaft 3 at the opposite side of the pulley 5 from the drum 8 is a second drum 10 having the eccentric boss or crank-chamber 11 and constructed integral with the sleeve 4 which is shown in Fig. 3 provided with an actuating worm 4'.

The driven members with the means for controlling their operation are similarly constructed, excepting in their right-and-left arrangement, and a description of the one will therefore suffice for the other.

Each of these drums has extending within the same from its web a fulcrum-stud 12 upon which is mounted the hub 13 of a segmental vibratory lever 14 having at its free end a cross-bar 15 provided at its outer edge with the notched seat 16. The lever 14 carries intermediate its ends the lateral stud 17 embraced by the apertured end 18 of a connecting-rod having at its opposite end the strap 19 embracing one of the eccentrics 6 or 7 of the driving member 5 which is in practice embraced by a belt leading from the source of power. During the rotation of the pulley, and while the drum remains at rest, the lever 14 performs idle reciprocatory movements upon its fulcrum-stud 12 within said drum.

Each of the driven members carries a second fulcrum-stud 20 upon which is mounted the hub 21 of a segmental thrust-lever 22 extending circumferentially toward the lever 14 and formed at its adjacent end with the cross-bar 23 adapted to enter and engage the angular seat 16 of the vibratory lever 14 when the latter is in its extreme outer position as represented in Fig. 1. Each drum is provided in its web portion with a clearance aperture 26' to receive the adjacent ends of the cross-bars 15 and 23. The thrust-lever is normally pressed inwardly by means of a spring 24 interposed between the bottom of a socket formed in its outer edge and the inner face of the drum.

The lever 22 is formed with an outwardly projecting lug 25 passing through a clearance opening 26 in the face of the drum and carrying a laterally extending roller-stud 27 adapted to rest upon the outer face of a segmental cam-plate 28 disposed eccentrically to the face of the drum and provided with an outwardly extending shank 29. The shank 29 is secured by means of fastening screws 30 within a transverse seat of the head 31 of the holding arm 32 having a tubular hub 33 fitted upon the rock-shaft 34. The hub of one of the levers 32 is secured by means of the set-screws 35 upon the shaft 34 to prevent the endwise displacement of the latter.

When the arm 32 is in its outer position, the cam-plate is in operative relation with the roller-stud 27 which it forces outwardly to retract the thrust-lever 22 from engagement with the vibratory lever 14, as represented in Fig. 1, but when the arm 32 is shifted toward the shaft 3, the release of the stud 27 permits the lever 22 to move inwardly under the action of its spring for contact with the outer edge of the lever 14 for introduction of the cross-bar 23 within the angular seat 16 as the lever 14 assumes its extreme outer position under the action of the crank-element 6.

Each of the frame-members 2 carries a headed fulcrum stud-pin 36 upon which is fitted the hub 37 of a vibratory segmental lever 38 constructed at its free end with a cross-bar 39 which is formed in its free edge with a notch to afford an angular seat 40. Each lever 38 carries intermediate its ends the lateral stud 41 embraced by the apertured end 42 of a connecting rod having at its opposite end the strap 43 embracing the eccentric 9 or 11 of one of the drums 8 and 10. During the rotation of the drums 8 and 10, the levers 38 perform idle reciprocatory movements upon their respective fulcrum-studs 36.

Upon the rock-shaft 34 intermediate each of the frame-members 2 and the adjacent hub 33 of the cam-plate carrying arm 29 is loosely fitted the hub 44 of a segmental stop-lever 45 extending circumferentially toward the lever 38 and formed at its adjacent end with the cross-bar 46 adapted to enter and engage the angular seat 40 of the vibratory lever 38 when the latter is in its extreme outer position as represented in Fig. 1. Each stop-lever 45 has a lateral stud-pin 47 entering the space intermediate the members 48 48' of a forked lug extending laterally from the hub 33, a spring 49 being interposed between said stud-pin and the bottom of a socket 50 in the member 48.

By the described resilient connection, the stop-lever 45 is maintained normally in an initial relation with the arm 32 in unison with which it is adapted to perform operative movements, but when shifted inwardly from outer retracted position while the vibratory lever 38 is in any but extreme outer position, the cross-bar 46 is adapted to rest against the outer edge of the lever 38 until it assumes extreme outer position, when the stop-lever is adapted to snap into operative engagement with the lever 38 under the action of its spring 49, as represented in Fig. 1.

By the obstruction of the free reciprocatory movement of the lever 38 when in its neutral position and during the reversal of its reciprocatory movement, not only the vibratory lever, but its actuating means become arrested, the momentum of the drum or driven member being arrested by the stop-lever 45 through the eccentric and its operative connection with the lever 38. As the stop-lever enters into engagement with the vibratory lever 38 while the latter is substantially at rest, its action thereon is effected without impact, and consequently without shock to the moving parts in arresting their movement.

From the foregoing description, it will be seen that the coupling and stopping means of the present improvement are alike in the construction, relation and mode of operation of their component parts, each comprising a vibratory lever deriving its operative movements from a rotary crank-element and adapted for engagement by an arresting element comprising a spring-pressed lever mounted upon a fulcrum sustained in fixed relation with that of said vibratory lever, the operative connection of said interengaging levers effecting a rigid locking connection between the actuating eccentric and the fulcrum-studs of said levers for interrupting the rotation of the one relatively to the other. While the parts referred to are represented in Fig. 4 as embodied in the stopping means, it will be observed that said figure represents substantially the construction and arrangement of the component parts of the coupling means excepting that the parts of one of said mechanism are in right-hand arrangement and the other in left-hand arrangement.

Sustained by the spaced frame members 2 parallel with the shaft 3 is a rock-shaft 51 upon which are fitted the tubular hubs 52 of operating levers 53, one of said hubs being fixed upon said rock-shaft by means of the set-screws 54, while the other is fitted within a bearing aperture of the adjacent frame member 2, the opposite extremity of the shaft 51 being journaled within a suitable aperture of the adjacent frame member 2. The free end of each lever 53 is pivotally connected by means of a pin 55 with one end of a short link 56 having its opposite end pivotally connected by means of the pin 57 with an apertured lug 58 depending from the hub 33.

As represented in the drawings, both the levers 53 are adapted to be actuated automatically and in unison, while one may be shifted also by manually controlled means. To this end, the outer extremity of the tubular hub 52 has secured thereon by means of the set-screw 59 the hub 60 of a laterally extending lever 61, and the adjacent extremity of the rock-shaft 51 has similarly fixed thereon by means of the set-screw 62 the hub 63 of a laterally extending lever 64. The lever 64 is shown provided at its outer end with a laterally projecting roller-stud 65 which enters the controlling cam-groove 66 of the cam-disk 67 which is adapted to be driven by suitable means, and preferably by an operative connection with the worm 4' of the sleeve 4.

The lever 64 is provided with the upwardly extending bearing bosses 68 and 69 in which is journaled the rock-shaft 70 having fixed upon its forward end by means of the set-screw 71 the hub 72 of a depending latch-arm 73 having a lateral notch 74 in its lower end for engagement with the outer end of the lever 61, as represented in Fig. 7. The rock-shaft 70 has fixed thereon intermediate its bearings the collar 75 to which is attached one end of a spring 76 having its opposite end attached to the bearing lug 69 by means of which the latch-arm 73 is maintained yieldingly in retracted position and disengaged from the lever 61, as represented in dotted lines in Fig. 7.

The rock-shaft 70 has secured to its opposite end by means of the set-screw 75 the hub 76 of a crank-arm 77 having an aperture in its outer end entered by the hooked upper end of the treadle-rod 78 by means of which it may be depressed for moving the latch-arm from retracted position into operative engagement with the lever 61. The lever 61 has secured thereon by screws 79 the flat spring 80 whose outer end rests upon the fixed stop-pin 81 set in the outer end of the adjacent fulcrum-pin 36, whereby the lever 61 is normally maintained in elevated position in contact with the said stop-pin, but is adapted to be depressed in unison with the lever 64 in opposition to the spring 80 when engaged by the latch-arm 73.

Under normal conditions, with the treadle released, the crank-arm 77 is in its upper position and the latch-arm 73 retracted, as represented in dotted lines in Fig. 7, thereby permitting the lever 61 to remain in normal position in engagement with the stop-pin 81, as represented in Fig. 7. In this normal condition of the parts, the drum 10 remains continuously coupled with the driving pulley 5 through its connection with the actuating eccentric 7, and the cam-wheel 67 and any other parts of the machine connected with said drum receive from the latter constant operative movements. In the position of the parts represented in Fig. 1, wherein the lever 64 is depressed by its stud 65 entering the crook of the cam-groove 66, the toggle 53—56 is straightened so as to temporarily disconnect the coupling and thrust-levers 14 and 22 and maintain the vibratory lever 38 and stop-lever 45 in interengaging relation, whereby the drum 8 is maintained in a position of rest in a fixed and predetermined relation with the stationary fulcrum-studs 34 and 36. Hence, with the stitch-forming mechanism of a sewing machine operatively connected with the drum 8, the parts may be so timed that in the stopping of the drum the needle will invariably assume a final position retracted from the work.

As the cam-disk 67 continues its rotation, the stud 65 enters the upper and longer portion of the cam-groove 66, thereby lifting the lever 64 and bending the toggle 53, 56, by means of which the cam-plate carrying arm 32 is moved inwardly toward the driving shaft 3 for release of the roller-stud 27, which permits the thrust-lever 22 to move inwardly under the action of its spring 24 for engagement with the coupling lever 14 when next in its extreme outer position. Simultaneously with the actuation of the arm 32, the stop-lever 45 is forcibly shifted outwardly by the positive engagement of its stud-pin 47 with the forked-lug member 48′, thereby freeing the vibratory lever 38 for operative movement when the drum 8 becomes coupled with the driving pulley 5 by the means described.

In case it is desired to simultaneously arrest the rotation of both of the drums 8 and 10, the treadle-rod 78 is drawn downwardly to shift the latch-arm 73 into engagement with the lever 61, so that in the depression of the lever 64 by encounter of the roller-stud 65 with the crook of the cam-groove 66, the lever 61 will be carried with it, and both drums will be uncoupled from the driving pulley and forcibly stopped by engagement of the vibratory levers 38 with their respective stop-levers 45. The release of the treadle-rod 78 permits the rocking of the shaft 70 under the action of its spring 76 for movement of the latch-arm 73 from its full-line or operative position into its dotted line or retracted position, as represented in Fig. 7, thereby permitting the rise of the lever 61 under the action of its spring 80 and the unlocking of the drum 10 and its recoupling with the driving pulley for resumption of its rotary movement and consequently the continued movement of the cam-wheel 67 if connected therewith; the corresponding control of the drum 8 being effected through the movement of the roller-stud 65 from the crook into the longer straight portion of the cam-groove 66.

From the foregoing description it will be seen that, as the driving element 5 has a continuous movement extending over the described periods embracing the coupling and uncoupling of the driven member therewith, the movement of the vibratory coupling lever does not cease during such period, although means are provided for interrupting its vibratory movements. Thus, during its period of vibration the coupling lever has a reciprocatory movement relatively to the driving member, while during its non-vibratory period the motion imparted to it by the driving element is converted into one of rotation in unison with the driving member with which it is temporarily locked in fixed relation.

In the preferred form of the present improvement, the vibratory lever and its arresting means are mounted upon a relatively fixed support, whether that be one of the driven members or the supporting frame, but it is obviously unessential that both of these elements be mounted upon the same part, so long as suitable means are provided for interrupting the vibratory movements and thereby locking the said lever in fixed relation with its actuating crank-element upon the driving or driven member.

It will be observed that the present invention involves as a characteristic feature coupling means between moving and stationary members, such means, in the embodiment shown, being identical in construction. It will also be observed that the operation of these different coupling means is identical, in that each serves to couple at the time of its operation a moving member and a stationary member. The coupling comprising the vibratory lever 14 and the non-vibratory thrust-lever 22 operates at its proper time to couple the continuously moving driving member 5 with one of the then stationary driven members 8 or 10 so as to lock together the two members so connected for rotation in unison; while the coupling comprising the vibratory lever 38 and the non-vibratory thrust-lever 45 operates at its proper time to couple one of the then moving drums 8 or 10 with a stationary member which in such case consists of the machine frame supporting the levers 38 and 45, so as to lock together the two members so connected to bring the moving member to the condition of rest of such stationary member.

It is evident that the present improvement is adapted for embodiment in machines of widely different character, and may be very materially modified in its construction and arrangement of parts within the scope of the present invention.

Having thus set forth the nature of the invention, what I claim herein is:—

1. In a driving device, in combination, a rotary driving member, a driven member, an element connected therewith and mounted independently of said driving member, an operative connection between the driving member and said element whereby motion is transmitted from the one to the other, and means whereby the character of said motion may be changed.

2. In a driving device, in combination, rotary driving and driven members, an actuating element movably mounted upon the driven member, a connection between the latter and said actuating element for imparting thereto reciprocatory movements, and means applied to the reciprocatory element for converting said motion into rotary motion, and vice versa.

3. In a driving device, in combination, a driving member, a driven member, an element movably mounted upon and adapted to rotate with said driven member, an operative connection between the driving member and said element for transmitting from the one to the other reciprocatory movement, and means acting at an end of the range of said reciprocatory movement for changing the character of said movement.

4. In a driving device, in combination, driving and driven members, a reciprocatory element sustained by one of said members and having an operative connection with the other from which it derives idle reciprocatory movements, and means, independent of said connection, or interrupting said reciprocatory movements.

5. In a driving device, in combination, driving and driven members, a normally flexible connection between them, and means for rendering said connection rigid for establishing driving relation between said members.

6. In a driving device, in combination, driving and driven members, a reciprocatory element sustained by the driven member, an operative connection between the driving member and said element, and means carried by the driven member for locking said element against reciprocation.

7. In a driving device, in combination, driving and driven members, a reciprocatory element sustained by the driven member, an operative connection between the driving member and said element for normally imparting to the latter reciprocatory movements of uniform amplitude, and locking means adapted for engagement with said element at an extreme end of its range of reciprocatory movement for arresting said movement.

8. In a driving device, in combination, driving and driven members, a vibratory lever pivotally mounted upon one of said members, means connected with the other member for imparting operative movements thereto, and means carried by the first-named member for arresting the vibratory movements of said lever.

9. In a driving device, in combination, driving and driven members, a coupling device between them comprising interengaging elements each movable toward and from the other, means connected with the driving member for imparting to one of said elements normal to-and-fro operative movements, and means connected with the other of said elements and acting thereon while the first-named element is in its closest proximity thereto for effecting the interlocking engagement of said elements without shock.

10. In a driving device, in combination, driving and driven members, a vibratory lever pivotally mounted upon one of said members, a crank-element connected with the other member, a connection between said crank-element and the vibratory lever for imparting vibratory movements thereto, and means carried by the first-named member for arresting the vibratory movements of said lever.

11. In a driving device, in combination, driving and driven members, a vibratory lever pivotally mounted upon one of said members, means connected with the other member for imparting operative movements thereto, a thrust-lever also carried by the first-named member and affording a stop for arresting the vibratory movements of the first-named lever, and means for shifting said thrust-lever into and out of operative relation with the first-named lever.

12. In a driving device, in combination, driving and driven members, a vibratory lever pivotally mounted upon one of said members, means connected with the other member for imparting operative movements thereto, a thrust-lever also carried by the first-named member and affording a stop for arresting the vibratory movements of the first-named lever, a spring for shifting the thrust-lever into operative relation with the vibratory lever, and means sustained independently of the driving and driven members for retracting the thrust-lever in opposition to said spring.

13. In a driving device, in combination, driving and driven members, a vibratory lever pivotally mounted upon one of said members, means connected with the other member for imparting operative movements thereto, a thrust-lever also carried by the first-named member and affording a stop for arresting the vibratory movements of the first-named lever, a spring for shifting the thrust-lever into operative relation with the vibratory lever, a cam-plate movably mounted independently of the driving and driven members and adapted for engagement with the thrust-lever, and means for shifting said cam-plate into and out of operative relation with the latter.

14. In a driving device, in combination, driving and driven members, a vibratory lever pivotally mounted upon one of said members, means connected with the other member for imparting operative movements thereto, a thrust-lever also carried by the first-named member and affording a stop for arresting the vibratory movements of the first-named lever, a spring for shifting the thrust-lever into operative relation with the vibratory lever, a swinging arm mounted upon a fixed fulcrum, a cam-plate mounted thereon and adapted for engagement with the thrust-lever, a second arm also mounted upon a fixed fulcrum and having a link connection with the first-named arm and adapted to assume a position in substantial alinement with the second-named arm in one of its extreme positions, and means for shifting the second-named arm to move said cam-plate for control of the position of said thrust-lever.

15. In a driving device, in combination, a rotary driving member, a driven member, means for establishing and interrupting driving relation between the same, an element movably mounted independently of said driving and driven members, a connection between the driven member and said element for imparting to the latter operative movement, and a stop-element also mounted independently of the driving and driven members and adapted for movement into and out of the range of movement of the first-named element for arresting its movement derived from the driven member and through it the driven member.

16. In a driving device, in combination, a rotary driving member, a driven member, means for establishing and interrupting driving relation between the same, an element movably mounted independently of said driving and driven members, a connection between the driven member and said element for imparting to the latter operative movement, controlling means for said means mounted independently of the driving and driven members, and a stop-element also mounted independently of the driving and driven members and connected with said controlling means by which it is moved into and out of the range of movement of the first-named element and adapted to arrest its movement derived from the driven member and through it the driven member.

17. In a driving device, in combination, a rotary driving member, a driven member, means for establishing and interrupting driving relation between the same, an element movably mounted independently of the driving and driven members, a flexible connection between the driven member and said element for imparting to the latter operative movement, and means for rendering said connection rigid and thereby opposing the continued movement of the driven member.

18. In a driving device, in combination, a rotary driving member, a driven member, means for establishing and interrupting driving relation between the same, an element movably mounted independently of the driving and driven members, an operative connection between said driven member and said element for transmitting from the one to the other reciprocatory movement, and means acting at an end of the range of said reciprocatory movement for arresting the same and thereby stopping said driven member without shock.

19. In a driving device, in combination, a driven member, actuating means therefor adapted to be disconnected therefrom, an element mounted independently of said driven member, means connected with said driven member for imparting to said element reverse movements, and arresting means controlled and adapted to operatively engage said element during the reversal of its operative movements.

20. In a driving device, in combination, a driven member, actuating means therefor adapted to be disconnected therefrom, a vibratory lever movable upon a fulcrum sustained independently of said member, means connected with said driven member for imparting operative movements to said lever, and means for arresting the vibratory movements of said lever.

21. In a driving device, in combination, a driven member, actuating means therefor adapted to be disconnected therefrom, a vibratory lever movable upon a fulcrum sustained independently of said member, means connected with said driven member for imparting operative movements to said lever, a stop-lever movable into and out of the range of movement of said vibratory lever, and controlling means for said stop-lever.

22. In a driving device, in combination, a driven member, actuating means therefor adapted to be disconnected therefrom, a vibratory lever movable upon a fulcrum sustained independently of said member, means connected with said driven member for imparting operative movements to said lever, a stop-lever movable into and out of the range of movement of said vibratory lever, a controlling lever for said stop-lever, and a resilient connection between said controlling lever and stop-lever.

23. In a driving device, in combination, driving and driven members, coupling means for establishing and interrupting driving relation between the same, a vibratory lever having a fixed fulcrum, actuating means therefor connected with the driven member, a stop-lever also mounted upon a fixed fulcrum, and means for effecting the engagement and disengagement of said levers.

24. In a driving device, in combination, driving and driven members, an element movably mounted upon said driven member, means connected with the driving member for imparting to said element reverse operative movements, arresting means for interrupting said operative movements of said element, an element mounted independently of the driven member, means connected with said driven member for imparting to said element reverse movements, arresting means for interrupting the operative movement of the second-named element, and controlling means for throwing each of said arresting means into engagement with its respective coacting element while the other is retracted, and vice versa.

25. In a driving device, in combination, driving and driven members, an element movably mounted upon said driven member, means connected with the driving member for imparting to said element reverse operative movements, arresting means mounted upon the driven member and arranged for engagement with said element at the point of reversal of its movement, an element mounted independently of the driven member, means connected with said driven member for imparting to said element reverse movements, arresting means arranged for engagement with the second-named element at its point of reversal, and controlling means for throwing each of said arresting means into engagement with its respective coacting element while the other is retracted, and vice versa.

26. In a driving device, in combination, driving and driven members, a reciprocatory element mounted upon the driven member and deriving operative movements from the driving member, a reciprocatory element mounted upon a fixed support and deriving reciprocatory movements from the driven member, a thrust-sustaining element movably mounted upon the driven member and adapted for engagement with the first-named reciprocatory element, a stop-element movably mounted upon a fixed support and adapted for engagement with the second-named reciprocatory element, and means including a common operating member for alternately effecting the arrest of said reciprocatory elements by their respective coacting elements.

27. In a driving device, in combination, an actuating crank-element, a reciprocatory element, a support therefor relative to which said crank-element is adapted to rotate, an operative connection between said elements, and arresting means adapted for connection with and disconnection from said reciprocatory element for respectively locking and releasing the latter for or against operative movement.

28. In a driving device, in combination, an actuating crank-element, a vibratory lever, a fulcrum therefor relative to which said crank-element is adapted to rotate, an operative connection between the crank-element and said lever, a motion-arresting lever having a fulcrum sustained in fixed relation with that of said vibratory lever, and means for shifting the motion-arresting lever into and out of positive interengaging relation with said vibratory lever.

29. In a driving device, in combination, an actuating crank-element, a reciprocatory element, a support therefor relative to which said crank-element is adapted to rotate, an operative connection between said elements, and arresting means active in an extreme position of said reciprocatory element for connection with and disconnection from the latter for respectively locking and releasing it for or against operative movement.

30. In combination, a moving member, a relatively stationary member, an element pivoted to the latter, an operative connection for communicating motion from the moving member to said pivoted element, and means fixedly pivoted relatively to said pivotal element for locking said pivoted element against motion relatively to the moving member.

31. In combination, a moving member, a stationary member, an element connected with the latter and mounted independently of the moving member, an operative connection for communicating reciprocatory movements from the moving member to said element, and means independent of said connection and acting at an extreme position of said element for locking the latter against said reciprocatory movement, said moving member being confined against sidewise movement.

32. In a power-transmitter, driving, driven and stationary members, connections between said driving and driven members for moving them in unison, similar connections between said driven and stationary members for arresting movement of the driven member, and means for controlling said connections.

33. In a power-transmitter, driving, driven and stationary members, disconnectible actuating mechanism between said driving and driven members for moving them in unison, disconnectible mechanism between said driven and stationary members for arresting movement of the driven member, and means for establishing or breaking down the operation of said disconnectible connections in alternation.

34. In a power-transmitter, a driver, a stationary part, driven members, disconnectible mechanism between said driven members and said driver for moving them in unison when coupled together, disconnectible mechanism between the stationary part and the driven members for arresting movement of said driven members when they are coupled up, and means for controlling said disconnectible mechanisms, said controlling means including devices permitting a continuation of the movement of one of said driven members after the other has been brought to rest.

35. In a power-transmitter, in combination, a rotary driving member, a pair of rotary driven members, means for coupling each of said driven members to said rotary driving member for movement in unison therewith, means for uncoupling said first mentioned means, and additional means for stopping the rotation of one of said driven members while the other continues to rotate with the driving member.

36. In a power-transmitter, in combination, a rotary driving member, a pair of rotary driven members, means for coupling each of said driven members to said rotary driving member for movement in unison therewith, means for uncoupling said first mentioned means, and selective means for stopping the rotation of one or both of said driven members.

37. In a power-transmitter, in combination, a rotary driving member, a pair of rotary driven members, means for coupling each of said driven members to said rotary driving member for movement in unison therewith, means for uncoupling said first mentioned means, and automatic means for stopping the rotation of one of said driven members and manually controlled means for stopping the rotation of the other of said driven members simultaneously with the first mentioned driven member.

In testimony whereof, I have signed my name to this specification, in the presence of two subscribing witnesses.

ALBERT H. DE VOE.

Witnesses:
HENRY J. MILLER,
HENRY A. KORNEMANN, Jr.

Copies of this patent may be obtained for five cents each, by addressing the "Commissioner of Patents, Washington, D. C."

It is hereby certified that in Letters Patent No. 1,260,760, granted March 26, 1918, upon the application of Albert H. De Voe, of Westfield, New Jersey, for an improvement in "Driving Devices," errors appear in the printed specification requiring correction as follows: Page 2, line 62, for the compound word "crank-chamber" read *crank-member;* same page, line 118, for the compound word "set-screws" read *set-screw;* page 5, line 72, claim 4, for the word "or" read *for;* and that the said Letters Patent should be read with these corrections therein that the same may conform to the record of the case in the Patent Office.

Signed and sealed this 25th day of June, A. D., 1918.

[SEAL.]

R. F. WHITEHEAD,

*Acting Commissioner of Patents.*

Cl. 74—46.